United States Patent [19]
Driscoll

[11] Patent Number: 5,307,409
[45] Date of Patent: Apr. 26, 1994

[54] APPARATUS AND METHOD FOR FAULT DETECTION ON REDUNDANT SIGNAL LINES VIA ENCRYPTION

[75] Inventor: Kevin R. Driscoll, Maple Grove, Minn.

[73] Assignee: Honeywell Inc, Minneapolis, Minn.

[21] Appl. No.: 995,107

[22] Filed: Dec. 22, 1992

[51] Int. Cl.$^5$ .............................................. H04K 1/00
[52] U.S. Cl. ......................................... 380/2; 380/42
[58] Field of Search ..................................... 380/2, 42

[56] References Cited

U.S. PATENT DOCUMENTS 4,251,059 9/1982 Gregoire et al. ...................... 380/2
5,161,186 11/1992 Dolev et al. ............................ 380/2

Primary Examiner—David C. Cain
Attorney, Agent, or Firm—Dale E. Jepsen; Ronald C. Champion; Albin Medved

[57] ABSTRACT

A fault detection apparatus and method combines each of a plurality of redundant digital data signals with a unique key signal for transmission over one of a plurality of signal lines and recombines each with its unique key signal at a receiving end. The recombined signals are then compared at the receiving end to detect certain faults between or among the plurality of what should be identical received signals.

13 Claims, 4 Drawing Sheets

APPARATUS AND METHOD FOR FAULT DETECTION ON REDUNDANT SIGNAL LINES VIA ENCRYPTION

FIELD OF THE INVENTION

This invention relates to fault detection on redundant signal lines and more particularly to a method and apparatus for providing a unique encryption on each of the signal lines in order to enable the detection of shorts, opens, transmission collisions and correlated transient upsets on the signal lines.

DESCRIPTION OF THE PRIOR ART

Prior fault detection schemes on redundant transmission lines have included coding by inverting one of two identical signals. However, this simple inversion will not be functional for multiple signal lines where more than two are present.

SUMMARY OF THE INVENTION

In accordance with the present invention a fault detection method is provided wherein each of the digital signals is combined with a unique encryption key in an exclusive or (XOR) logic gate, the output of which is coupled to a signal line. As each of the signals, when combined with its unique encryption key in the XOR has a unique waveform different from each of the other encrypted signals, faults such as shorts between adjacent signal lines, open circuits and collisions may be detected. At the receiving end the encrypted signal is recombined with its unique encryption signal in a second XOR logic gate, the output of which has the same waveform as the original data input signal if there are no faults.

The operation and advantages of the invention will be best understood from the following description of the preferred embodiment with reference to the accompanying drawings.

DESCRIPTION OF THE PREFERRED EMBODIMENT

Figure 1:
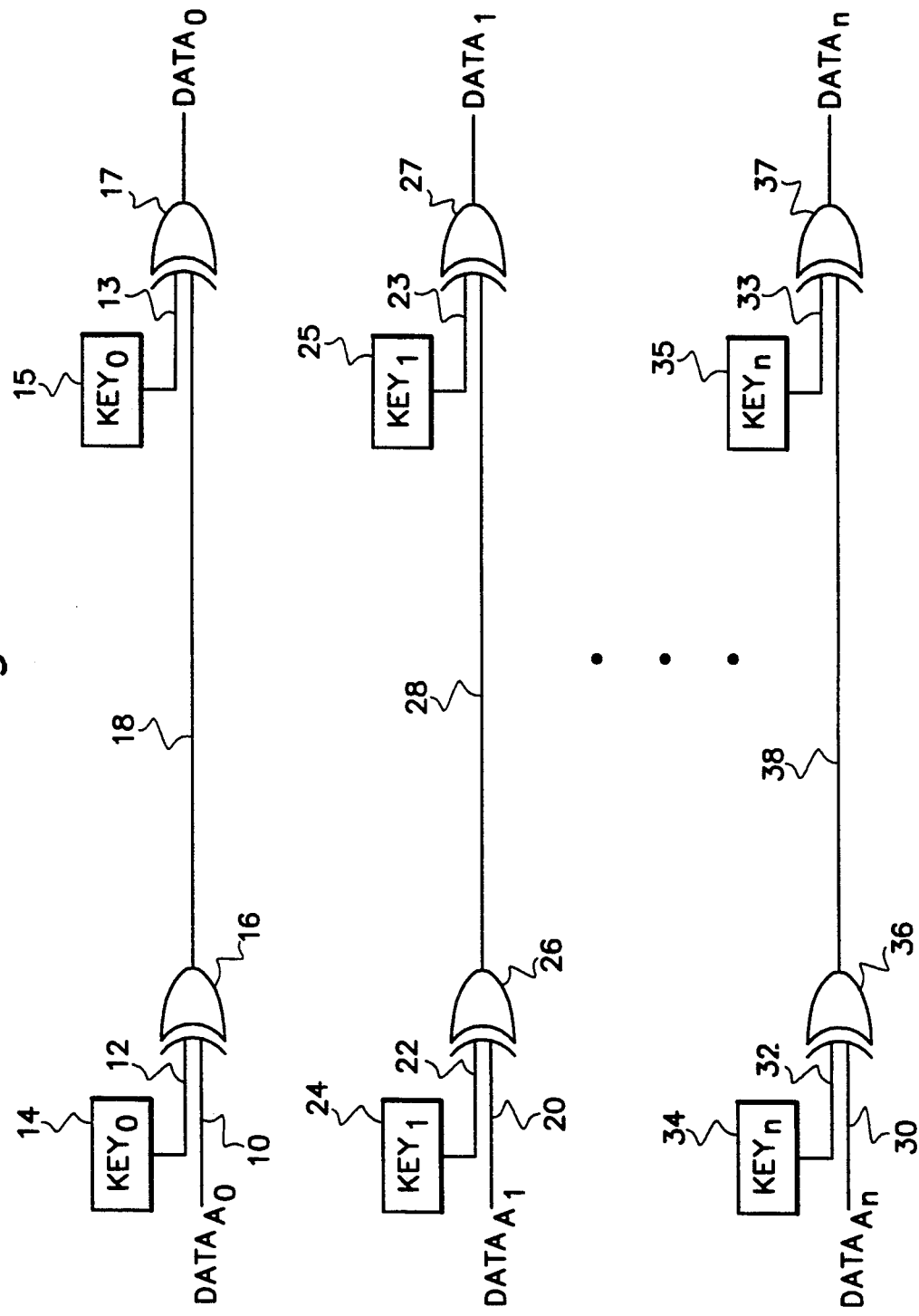
FIG. 1 is a schematic diagram of a preferred embodiment of the invention.

Shown in FIG. 1 is a schematic diagram of the present invention wherein a digital data signal is input on line 10 as an input to XOR gate 16. The other input to XOR gate 16 is a key signal 14 which is input on line 12. The output at line 18 consists of the combination of data signal A0 and the key signal coming from key zero.

At the receiving end of the transmission signal line the encrypted signal on signal line 18 is combined with the same key signal on line 13 through XOR gate 17. The receiver key zero, 15, is the same as the transmitter key zero, 14. If there are no faults, the output of XOR gate 17 should be the same as the original digital data signal input on line 10. In a similar fashion a second digital signal which under normal conditions will be identical to that on line 10, is input on line 20, and combined with a different key signal on line 22. The output of XOR gate 26 will therefore be different from that of XOR gate 16 when the data input signals are identical.

As with the first channel, the encrypted signal on line 28 is combined with the unique key signal on line 23 resulting in an output from XOR gate 27 which is identical to the original input data on line 20. Although the data outputs from the decryption XOR gates 17 and 27 are now identical, the intermediate, or encrypted, signals on lines 18 and 28 will be different as a result of the combination with the unique keys on lines 12 and 22.

The output, or data signals from XOR gates 17, 27 and 37 should be identical with identical data inputs on lines 10, 20 and 30. Utilizing a comparison of the outputs of XOR gates 17, 27 and 37, various failures or faults can be detected. For example, if line 18 should short to line 28, the resultant identical signal will be input to gates 17 and 27. Since gates 17 and 27 are receiving different key inputs on lines 13 and 23 respectively, the outputs of gates 17 and 27 will be different and this difference will be detected by the comparison of the output data streams. The comparison may be made using any of numerous known apparatus or methods for comparison of digital signals.

Because the data inputs on redundant lines are identical and the key inputs are different, the encrypted signals on the signal lines will also be different. When any line-to-line short or transmission collision occurs, the dominant signal will appear on the affected lines. When the signals are then decrypted by combining the encrypted signals with their corresponding key signals, any short or collision will cause a difference in output data that should be identical. In a similar manner a short of one of the encrypted lines to ground or an open will be detected through the comparison of the decrypted data with that of the other signal lines.

Figure 2:
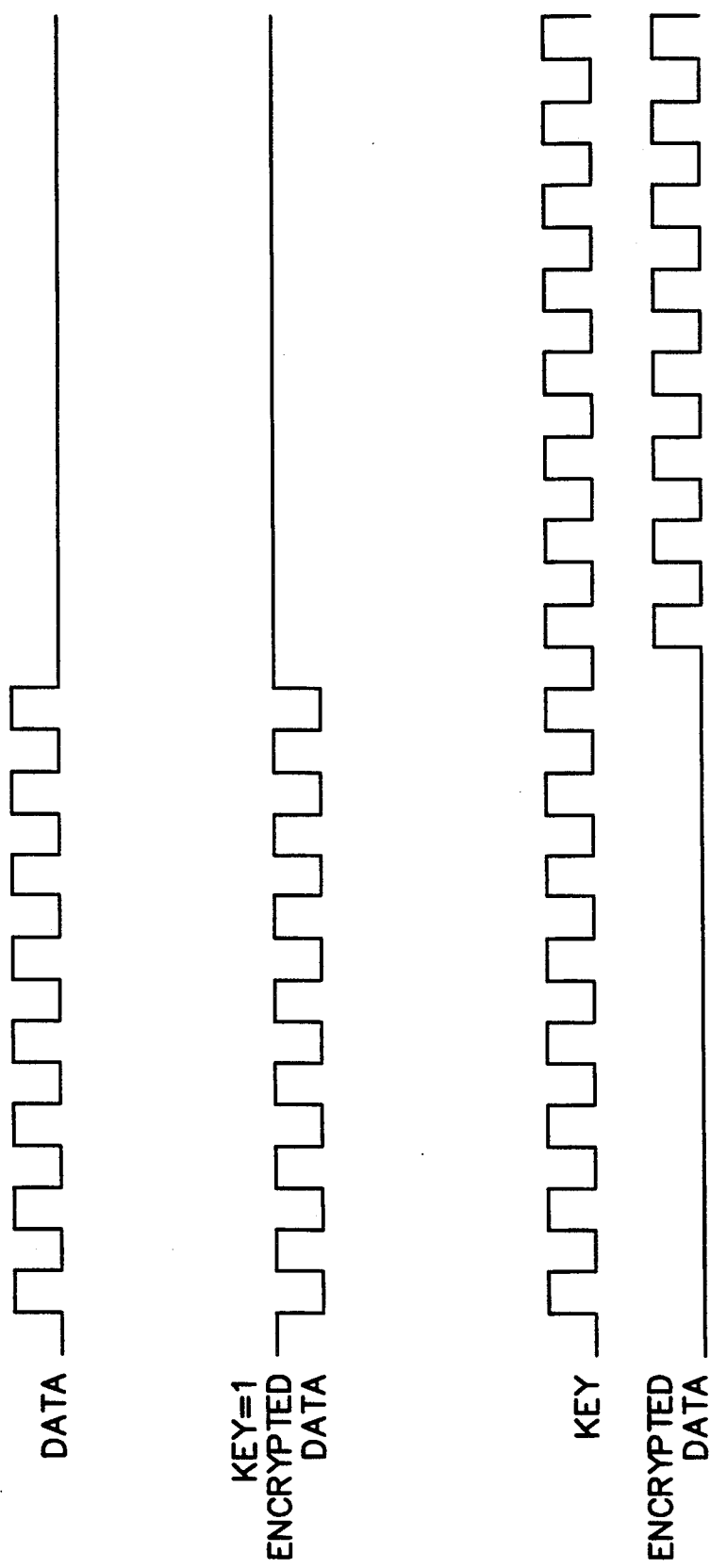
FIG. 2 is a diagram illustrating the shift from high frequency to low and low to high with different key signal inputs.

An additional feature of the fault detection system is a shift in the frequency content of the encrypted data signal when certain particular keys are used. As shown in FIG. 2, a data signal comprising first a high frequency content, then a low frequency content is mixed with, in the first example a key equal to a constant or continuous logical one and in a second example with a key equal to an alternating zero and one bit pattern.

As shown, a resultant encrypted data signal in the case where the key is equal to a constant logical one, is simply the inverse of the original data signal. In the case where the key is equal to a bit stream of alternating ones and zeros, the encrypted data signal becomes a steady low signal for an input data signal equal to alternating ones and zeros, and it becomes an alternating zero and one pattern where the input data stream is a steady logical zero. It can be seen from this example that by appropriate selection of the key signal, the frequency content of the encrypted signal may be shifted from a high frequency to a low frequency content or vise versa.

Generally, if the key has a high frequency content the frequency of the encrypted data will tend to be the inverse of the unencrypted data. For example, as shown on the third line of FIG. 2, where the key has a high frequency content the resultant encrypted data has a low frequency, or in this case a steady state value. Where the data has a low frequency content, such as a steady state zero, the encrypted data has a high frequency content. This frequency shift can be used to detect errors caused by frequency dependent faults such as those caused by reactances. For example, this will cause any DC component of NRZI encrypted signals to be different, thereby facilitating the detection of a level-shift induced bit error rate (BER).

As an additional feature, the power usage for various data patterns may be made more nearly constant by changing the frequency spectrum and polarity of the encrypted signals. For example, if the unencrypted data consisted of primarily logical zeros there would be a significant power change between that data signal and a data signal which consisted primarily of logical ones. By encrypting the like data input signals with different keys the encrypted data produces an overall average data signal with a more or less constant power requirement.

Figure 3:
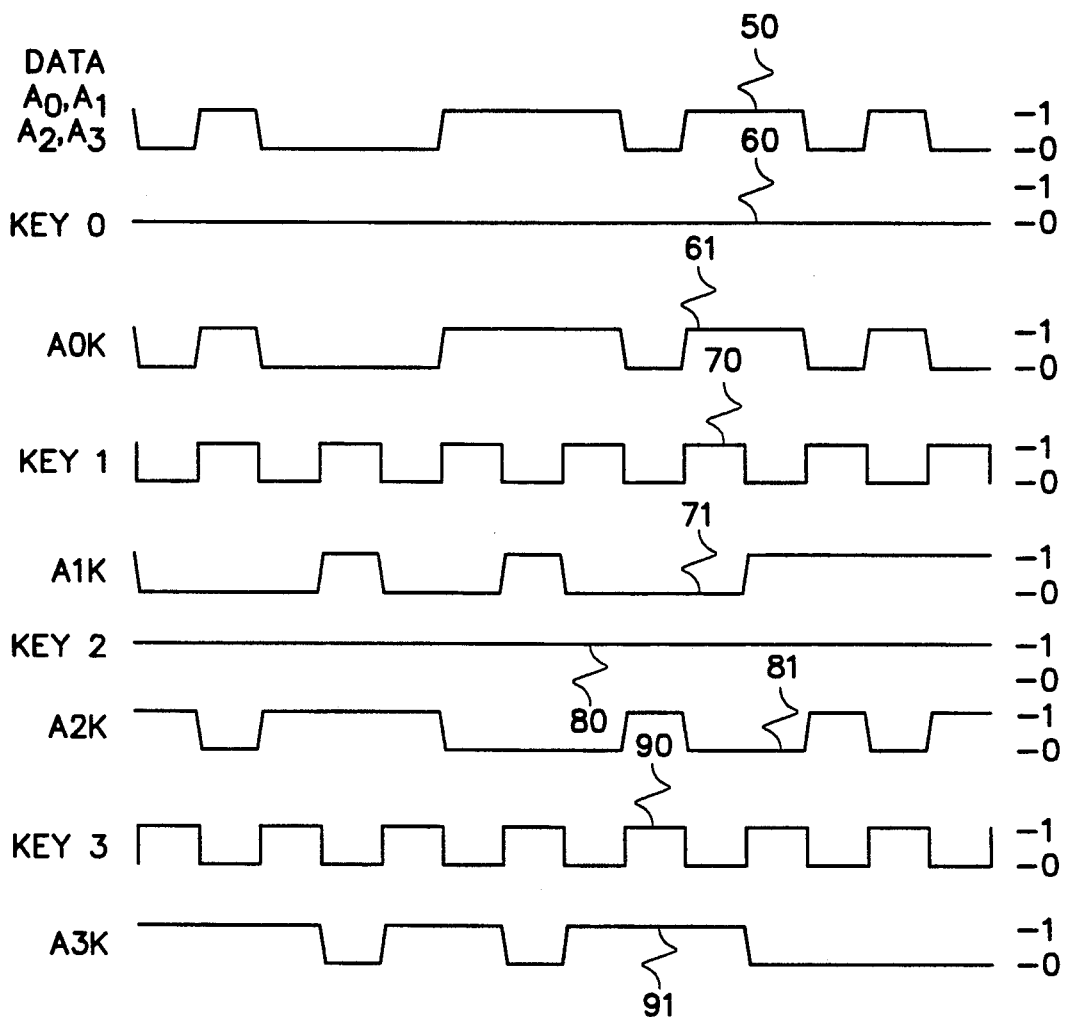
FIG. 3 is a diagram illustrating waveforms for a specific four channel implementation of a system of the present invention.

FIG. 3 illustrates a specific implementation utilizing four separate data signal lines and the specific corresponding key signals shown on lines 60, 70, 80 and 90. For the illustrated specific implementation, the input data are identical and comprise a series of alternating high and low digital data signals as shown on line 50. For the first signal line the key has been selected to be a constant logical zero. With the key input equal to a constant logical zero on line 12, the resultant output from the XOR gate is simply a repeat of the encrypted input data, as shown by line 61 having the identical waveform of line 50.

For the second transmission line the key is selected, as shown on line 70, to be a series of alternating logical zeros and ones. Line 71 shows that the encrypted data signal now takes on a different waveform from that of line 61.

The third key, labeled as Key 2 in FIG. 3, is selected to be a constant logical one. With a constant logical one input as the key signal, the output of the XOR gate will simply be an inversion of the original input signal. This can be seen by noting that waveform 81 is simply the inverse of the original data signal shown as waveform 50.

The fourth key signal is selected to be a series of alternating ones and zeros, but of reverse polarity from that of Key 1 shown as waveform 70. It can be seen that this key input results in the fourth encrypted data signal waveform 91, having a similar shape, but inverted from that of waveform 71.

Considering the four encrypted data signals on lines 61, 71, 81 and 91, exactly two signals are high and two signals are low at each instant of time. This results in a nearly constant DC power draw. At each transition of the data, exactly two signals change state and two do not. This results in a nearly constant AC power draw.

Figure 4:
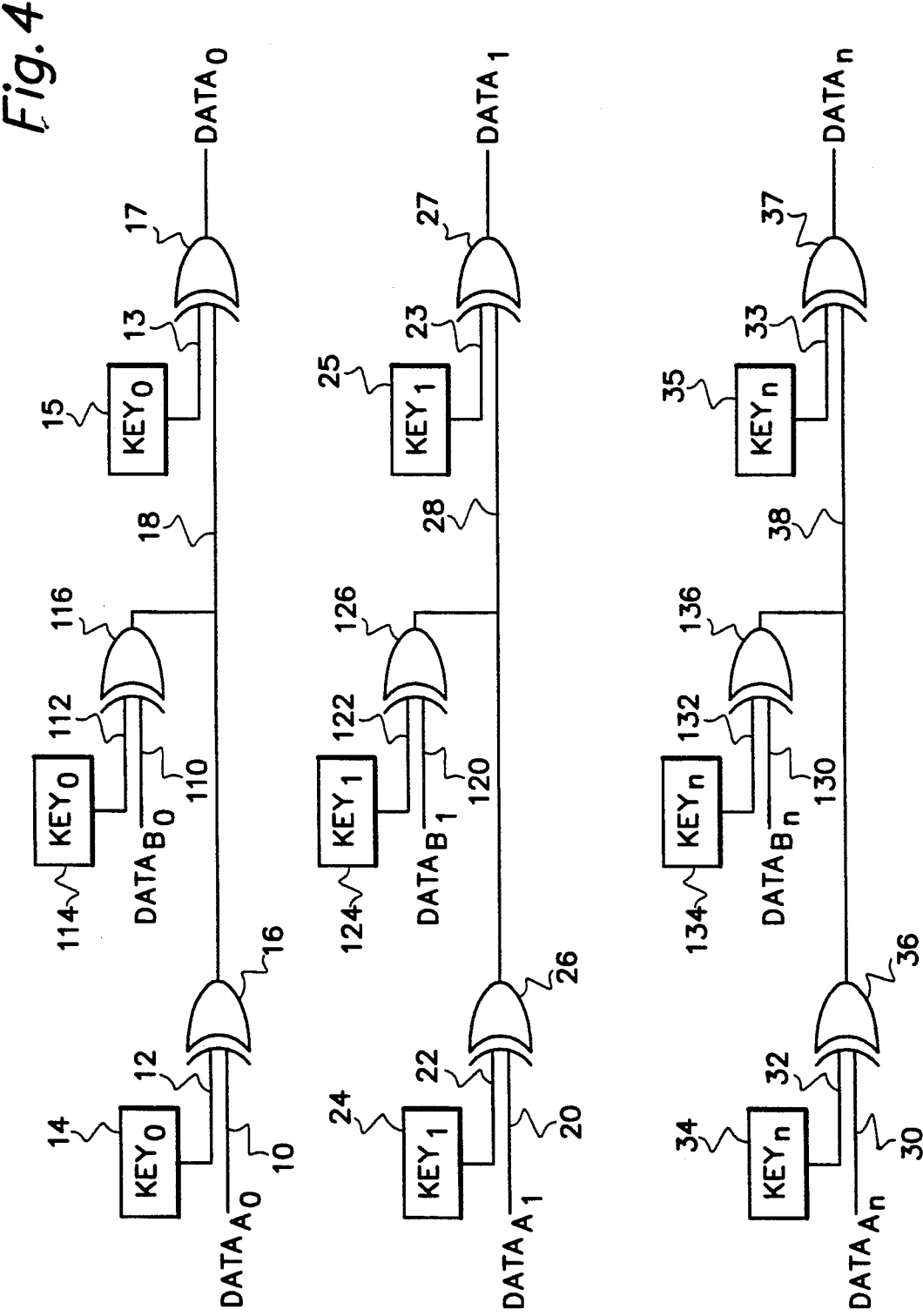
FIG. 4 is a schematic diagram illustrating a multiple input system which could be subject to transmission collisions.

In certain applications there will be more than one transmitter attached to any given signal line as illustrated in FIG. 4. A duplicate of the XOR gate and appropriate key input is shown as being attached to signal lines 18, 28 and 38. In normal operation data streams A0 and B0 would not be utilizing signal line 18 at the same time.

In certain failure modes, the A data input signals on lines 10, 20 and 30 may be transmitting at the same time as the B data signal lines on 110, 120 and 130. Under this particular failure mode, if there were no fault detection scheme or if the prior art failure detection methods were used, the data on signal lines 18, 28 and 38 would appear normal in that all of the signals would match. By utilizing the encryption method of the present invention, this collision fault can be detected. Whenever A and B transmit simultaneously, the signals appearing on 18, 28 and 38 will become the dominant value (either a 0 or a 1 depending on the signal means). Lines with different keys should have different values, but when simultaneous transmission causes a collision, the signals will be the same. This is detected at the receivers when the signals are recombined with the key signals.

As can be seen, almost any failure which causes the signals on lines 18, 28 and 38 to be identical, will be detected when the signals are decrypted through XOR gates 17, 27 and 37.

Where the signal line utilizes a parallel-to-serial converter at the transmission end, or a serial-to-parallel converter at the receiving end, the encryption or decryption respectfully, may be easily implemented by simply inverting the inputs to the parallel-to-serial converter, or the outputs from the serial-to-parallel converter, respectively. Where applicable, this method may be used to replace the key generators and XOR gates previously described. In the case of a serial-to-parallel converter at the receiving end, the decoding with a key repetition smaller than the number of stages in the serial-to-parallel converter may be accomplished without adding any additional hardware. The "decoding" is accomplished by simply utilizing the appropriate Q or Q not outputs of the converter stages.

While the invention has been described in conjunction with a specific apparatus and implementation, it would be obvious to one skilled in the art that other equivalent implementations may be made without departing from the scope of the invention. For example, the output of an XOR gate having a data signal and a constant logical zero as inputs, is the same as the original data signal. For the specific case where the key signal is a constant logical zero, the XOR gate may simply be deleted. Also, the output of an XOR gate having a data signal and a constant logical one as inputs, is the original data signal inverted. For the specific case where the key signal is a constant logical one, the XOR gate may be replaced by an inverter. As other examples, what has been described as a signal line may be any communication path, such as a wire, fiber optic conductor or RF channel, and the exclusive OR gate means may be substituted with any functional equivalent for combining a data signal with a key signal to obtain an encrypted or cyphered signal.

What is claimed is:

1. A fault detection apparatus for use in transmitting a first set of multiple redundant digital data signals over a plurality of signal lines comprising:

a plurality of sending exclusive OR gate means, each for receiving as inputs one of said first set of multiple redundant digital data signals and a unique key signal corresponding to one of said plurality of signal lines, the output of each of which is coupled to said one of said plurality of signal lines;

a plurality of receiving exclusive OR gate means, each of which is coupled to one of said plurality of signal lines and is for receiving as inputs the signal on said one of said plurality of signal lines and said unique key signal corresponding to said one of said signal lines; and comparison means for comparing the outputs of said receiving exclusive OR gate means.

2. A fault detection apparatus in accordance with claim 1 for four signal lines wherein said unique key signals comprise a first key signal which is a steady state logical zero, a second key signal which is an alternating zero and one bit pattern of constant frequency, a third key signal which is a steady state logical one, and a fourth key signal which is the inverse of said second key signal.

3. A fault detection apparatus in accordance with claim 1 wherein said key signals are selected to produce data signals on said signal lines having a nearly constant DC power level.

4. A fault detection apparatus in accordance with claim 1 wherein said key signals are selected to produce data signals on said signal lines having a nearly constant AC power level.

5. In a system for transmitting a plurality of identical redundant digital data signals over a plurality of signal lines, a method for fault detection comprising the steps of:
   combining each of said identical redundant digital signals with a unique key signal in a combining means to form an encrypted digital data signal,
   transmitting each of said encrypted digital data signals over one of said plurality of signal lines,
   recombining each of said encrypted digital data signals with its corresponding unique key signal in a recombining means to produce a decrypted digital data signal; and
   comparing said decrypted digital data signals to detect faults where all of said decrypted digital signals are identical absent a fault.

6. The method of claim 5 wherein said combining means and said recombining means comprise exclusive OR gate means.

7. The method of claim 6 wherein said key signals are selected to result in a nearly constant DC power level for the average of said encrypted digital signals.

8. The method of claim 6 wherein said key signals are selected to result in a nearly constant AC power level for the average of said encrypted digital signals.

9. A fault detection apparatus for transmitting first, second, third and fourth identical digital data signals over first, second, third and fourth respective signal lines comprising:
   first sending exclusive OR gate means for receiving said first digital data signal and a first key signal, the output of which is coupled to said first signal line;
   first receiving exclusive OR gate means, coupled to said first signal line, for receiving as inputs the signal on said first signal line and said first key signal;
   second sending exclusive OR gate means for receiving said second digital data signal and a second key signal, the output of which is coupled to said second signal line;
   second receiving exclusive OR gate means, coupled to said second signal line, for receiving as inputs the signal on said second signal line and said second key signal;
   third sending exclusive OR gate means for receiving said third digital data signal and a third key signal, the output of which is coupled to said third signal line;
   third receiving exclusive OR gate means, coupled to said third signal line, for receiving as inputs the signal on said third signal line and said third key signal;
   fourth sending exclusive OR gate means for receiving said fourth digital data signal and a fourth key signal, the output of which is coupled to said fourth signal line;
   fourth receiving exclusive OR gate means, coupled to said fourth signal line, for receiving as inputs the signal on said fourth signal line and said fourth key signal; and
   comparison means, coupled to the outputs of said first, second, third and fourth receiving exclusive OR gate means, for comparing the outputs of said first, second, third and fourth receiving exclusive OR gate means.

10. The apparatus of claim 9 wherein said first key signal is a constant logical zero, said second key signal is an alternating logical zero and logical one pattern of constant frequency, said third key signal is a constant logical one, and said fourth key signal is the inverse of said second key signal.

11. The apparatus of claim 9 wherein said first, second, third, and fourth key signals are selected to provide an average of the signals on said first, second, third and fourth signal lines having a constant DC power level.

12. The apparatus of claim 9 wherein said first, second, third and fourth key signals are selected to provide an average of the signals on said first, second, third and fourth signal lines having a constant AC power level.

13. A fault detection apparatus in accordance with claim 1 for additionally transmitting a second set of multiple redundant digital signals over said plurality of signal lines further comprising:
   an additional plurality of sending exclusive OR gate means, each for receiving as inputs one of said second set of multiple redundant digital data signals and a unique key signal corresponding to one of said plurality of signal lines, the output of each of which is coupled to said one of said plurality of signal lines.

* * * * *